3,151,127
TOCOPHEROL ASCORBATES

Abraham N. Spanel, Princeton, N.J., assignor to International Latex Corporation, Dover, Del., a corporation of Delaware
No Drawing. Filed Sept. 17, 1963, Ser. No. 309,405
2 Claims. (Cl. 260—343.7)

This invention concerns tocopherol ascorbates as new compositions of matter.

Vitamin E is known to comprise a group of seven natural substances known as tocopherols. They are fat-soluble, closely related chemical compounds found in vegetable oils such as wheat germ oil, rice oil, soybean oil and the like. Chemically, the tocopherols are substituted chromans, containing a phenolic hydroxyic group in the 6-position of the nucleus and are methylated to different degrees. Alpha-tocopherol has the greatest biologic activity while its isomers, beta, gamma, delta, epsilon, zeta and eta tocopherols have vitamin E activity to a lesser extent. The tocopherols and their esters, such as tocopherol acetate, tocopherol palmitate, and the like, are normally water-insoluble which property limits their admixture with other materials for oral administration and also limits their use in parenteral injections since oily solutions of the tocopherols are not readily adapted for injection.

It is an object of this invention to provide new esters of tocopherols which may be readily used for oral administration or for injection.

It is a further object of the invention to provide both vitamin E and vitamin C activity in one compound.

Other objects will be apparent from the description and claims which follow.

In accordance with the present invention I provide new derivatives of tocopherol in the form of ascorbic acid esters by reacting tocopherol and ascorbic acid to form the resulting ester. The reactants may be used in quantities where one or the other is employed in excess. The new compounds may be used to treat vitamin E deficiency singly, vitamin C deficiency singly, or both deficiencies simultaneously.

The reaction of the tocopherol compound with the ascorbic acid (levo-ascorbic acid) may be carried out in various ways, preferably as a trans-esterification reaction in an anhydrous solvent such as absolute ethyl alcohol, as for example tocopherol acetate reacted with ascorbic acid in excess. Esters of tocopherol which may be employed in the trans-esterification reaction include tocopherol acetate, tocopherol palmitate and the like.

The invention is applicable for providing ascorbates of tocopherols either in pure form or mixtures of two or more tocopherols, including both natural and synthetic tocopherols. The invention is of particular importance in connection with alpha tocopherol which exhibits a greater biological activity than its isomers.

The preparation of the tocopherol ascorbates embodying the invention is illustrated in the following example, it being understood that it is a preferred embodiment only and is not to be considered as limitative. It is desirable that the reactants be in as pure form as possible.

Example

Approximately 0.1 mol of alpha tocopherol acetate (47 grams) and 0.3 mol of ascorbic acid (53 grams) are mixed with 2500 cc. absolute alcohol and boiled under reflux with stirring for 8 hours under nitrogen stream. The mix is allowed to cool with precipitation of the product. The precipitate is filtered from the reaction mixture and washed with cold absolute alcohol to obtain 565 grams of tocopherol ascorbate in a yield of approximately 90% of theory.

It is of advantage to maintain an inert atmosphere during the esterification and purification with a gas such as nitrogen. It is not necessary however, particularly if reasonable precautions are taken to avoid prolonged exposure to air.

The invention is described with reference to certain preferred embodiments thereof but it will be understood that variations and modifications can be effected within the spirit and scope of the invention as described above and as defined in the appended claims.

I claim:
1. Tocopherol ascorbate.
2. A vitamin E-active ascorbate ester of a vitamin E-active tocopherol.

References Cited in the file of this patent

Fieser et al.: Advanced Organic Chemistry, page 378, Reinhold Publishing Corp., New York (1961).